3,632,746
DRIED STABLE ANTI-TUMOR PREPARATIONS AND PROCESS FOR PREPARING THE SAME
Toyoo Kono and Sakae Wada, Ageo-shi, Motoharu Shiba, Omiya-shi, and Takashi Matsuno, Akihiro Yamamoto, Haruki Ogawa, Hiroshi Okazaki, Shigeo Suzuki, and Takao Noto, Tokyo, Japan, assignors to Chugai Seiyaku Kabushiki Kaisha, Tokyo, Japan
No Drawing. Filed Aug. 19, 1968, Ser. No. 753,710
Claims priority, application Japan, Aug. 30, 1967, 42/55,178, 42/55,179
Int. Cl. A61k 27/00
U.S. Cl. 424—93
2 Claims

ABSTRACT OF THE DISCLOSURE

Anti-tumor preparations containing the cells of hemolytic streptococci having anti-tumor activity. The preparations are prepared by adding saccharides or amino acids to cell suspensions of hemolytic streptococci having anti-tumor activity, and then drying the resulting mixture.

This invention relates to dried stable anti-tumor preparations containing cells of hemolytic streptococci having anti-tumor activity, and to a process for preparing the same.

It is a well known fact that living cells of hemolytic streptococci having ability to produce streptolysin S, which is one of the hemolytic streptococcal toxins, have anti-tumor activity. Recently, there have been made researches to effect the therapy of tumors by use of said living cells. However, when said living cells are used in the form of suspensions, the anti-tumor activity thereof is quite unstable, and it has been difficult to store the suspension without lowering the anti-tumor activity until the time of application thereof.

An object of the present invention is to provide stable preparations of hemolytic streptococci which are not lowered in anti-tumor activity even when stored for a long period of time.

Another object of the invention is to provide a process for preparing said preparations.

In accordance with the present invention, the stable anti-tumor preparations are prepared by adding a disaccharide or polysaccharide (hereinafter referred to as "sacchraide") or an amino acid to cell suspension of hemolytic streptococci and then drying the resulting mixture.

The cell suspension of hemolytic streptococci having anti-tumor activity, which is used in the present invention, may be, for example, culture broth formed by cultivating the microorganism in a meat-infusion culture medium or in a culture medium composed mainly of yeast extract. Ordinarily, however, there is employed suspension obtained by suspending in a suitable medium the cells of said bacteria which have been isolated from the culture broth. Preferably as the medium is Bernheimer's basal medium (composition: 1.35 g. of maltose 12 ml. of 20% aqueous potassium dihydrogen phosphate solution adjusted to pH 6.9–7.0 with sodium hydroxide, 24 ml. of a 2% aqueous magnesium sulfate heptahydrate, and 132 ml. of distilled water; hereinafter referred to as "BBM"). Alternatively, however, distilled water or saline solution such as physiological saline solution or phosphate buffered physiological saline solution may also be used as the medium. In order to enhance the anti-tumor activity of the living cells by depriving the toxicity and ability of producing streptolysin S, it is more preferable to use suspension formed by adding antibiotics, for example, penicillin or cephalosporin C to the living cell suspension and treating the suspension at 30°–38° C. for 10–30 minutes and further at 38°–50° C. for 20–40 minutes. There may also be used suspension prepared by isolating the cells after the above treatment and again suspending the cells in a suitable medium.

Examples of saccharides and amino acids employed in the present invention are as follows:

Saccharides: Sucrose, lactose, dextran and soluble starch are particularly effective. These may be used either independently or in combination of 2 or more.

Amino acids: Any or D, L or DL isomers may be used. Arginine, ornoithine and methionine are particularly effective. Alanine, aspartic acid, citrulline, cysteine, cystine, glutamic acid, glycine, histidine, hydroxyproline, isoleucine, leucine, ornithine, phenylalanine, proline, serin, threonine, tyrosine and valine are also effective. These amino acids may be used either independently or in combination of 2 or more, and are used in many cases in the form of hydrochloride salts or metal salts.

The optimum amount of such saccharide or amino acid varies depending on the amount of cells in the suspension and on the kind of medium employed, but in general it is preferable to use the saccharide or amino acid in the ratio by weight of dry cells of hemolytic streptococci: saccharide or amino acid $=1:0.5\sim5$. For example, in the case of a BBM suspension showing an absorbancy at 660 m$\mu$ of about 0.5 when diluted to 20 times, the saccharide or amino acid is most preferably added so that the concentration thereof becomes 1–2% (dry cells: saccharide or amino acid $=1:1\sim3$), while in the case of said suspension showing an absorbancy at 660 m$\mu$ of about 0.5 when diluted to 40 times, the concentration is most preferably 3–5% (dry cells: saccharide or amino acid $=1:2\sim3$).

In drying the suspension, according to the present invention, no attention is particularly required to be paid to the survival of the bacteria, and therefore the drying condition is not restricted from said side. However, when the drying is carried out by heating, the anti-tumor activity thereof is lowered. In practice, therefore, it is desirable that the drying be carried out at 20° C. or below, and preferably at about $-10°$ C. or below under reduced pressure during the period when water is present in large amount, and be completed at about 20° C. (freeze-drying).

The preparation thus obtained substantially possesses the anti-tumor activity owned by the living cell suspension prior to drying and is not lowered in said activity even when stored for a long period of time. If necessary, therefore, the preparation may be resuspended in water or a suitable medium or solvent, and is then used for therapy. If the living cell suspension is dried without the addition of the saccharide or amino acid and then the dry cells are mechanically mixed with the saccharide or amino acid, the anti-tumor activity is not preserved.

The following examples illustrate the present invention.

EXAMPLE 1

(a) 300 g. of yeast extract (produced by Ebios Yakuhin Kogy K. K.) was dissolved in 10 l. of distilled water.

The solution was neutralized to pH 7.0-7.2 by means of 10% sodium hydroxide solution and was heated at 100° C. for 60 minutes. After cooling the solution, precipitated insolubles were removed by filtration, and the pH of the filtrate was readjusted to 7.0-7.2. Thereafter, the filtrate was poured into sterilized flasks and was steam-sterilized at 120° C. for 10 minutes to prepare a yeast extract medium. (All the subsequent operations were effected under sterilized conditions.) The thus prepared yeast extract medium was inoculated with culture broth of *Streptococcus hemolyticus* strain Su (ATCC No. 21060), which had previously been cultivated for 20 hours in 500 ml. of an ordinary meat-infusion medium, and static culture was carried out at 37° C. for 20 hours. Subsequently, the culture broth was chilled with ice and was centrifuged, and the bacterial cells obtained were washed 2 times with cold physiological saline solution and were then suspended in 500 ml. of BBM. The thus formed suspension, when diluted to 20 times, showed an absorbancy at 660 m$\mu$ of 0.47.

(b) To 300 ml. of this BBM suspension was added 60 ml. of physiological saline solution of penicilline G potassium (1.6×10$^5$ units/ml.), and the mixture was heated at 37° C. for 20 minutes and then at 45° C. for 30 minutes. (The thus treated suspension is referred to as "PCB-45," hereinafter.)

(c) To 50 ml. of the resulting PCB-45, 50 ml. of 4% aqueous sucrose solution was added. Each 2 ml. of the mixture were separately poured into vials under sterilized conditions, were pre-freezed at −30° C. for 2 hours, and were dried for 20 hours under a vacuum of 0.01 mm. Hg, while taking such a care that the temperature of the sample did not exceed 20° C. After drying, the pressure was brought back to atmospheric in sterile dry air, and the vials were immediately sealed to form a preparation. This dry preparation did not show any substantial decrease in anti-tumor activity even when stored at 37° C. for 6 months.

EXAMPLE 2

30 ml. of PCB-45, which had been obtained in the same manner as in Example 1(b), were centrifuged at a low temperature. Subsequently, the supernatant was discarded, and the precipitate was washed once with a cold physiological saline solution and was then suspended in a 2% aqueous sucrose solution to make 30 ml. Each 1 ml. of this suspension was separately poured into vials and was then dried in the same manner as in Example 1(c) to form a preparation.

EXAMPLE 3

To 30 ml. of PCB-45 obtained in the same manner as in Example 1(b), 30 ml. of 4% aqueous lactose solution were added. Each 2 ml. of the mixture were poured into vials and were then dried in the same manner as in Example 1(c) to form a preparation.

EXAMPLE 4

To 30 ml. of PCB-45 obtained in the same manner as in Example 1(b), 30 ml. of 4% aqueous dextran solution were added. Each 2 ml. of the mixture were separately poured into vials and were then dried in the same manner as in Example 1(c) to form a preparation.

EXAMPLE 5

To 30 ml. of PCB-45 obtained in the same manner as in Example 1(b), 30 ml. of 4% aqueous soluble starch solution were added. Each 2 ml. of the mixture were separately poured into vials and were than dried in the same manner as in Example 1(c) to form a preparation.

EXAMPLE 6

(a) To 100 ml. of living cell BBM suspension obtained in the same manner as in Example 1(a) were added with 20 ml. of physiological saline solution containing 108 mg./ml. of cephaloridine (synthetic cephalosporin C, produced by Glaxo Laboratories Co.), and the mixture was heated at 37° C. for 20 minutes and then at 45° C. for 30 minutes. (The thus treated suspension is referred to as CEB-45, hereinafter.)

(b) To 50 ml. of the resulting CEB-45, 50 ml. of 4% aqueous sucrose solution were added. Each 2 ml. of the mixture were separately poured into vials under sterilized conditions, and were dried in the same manner as in Example 1(c) to form a preparation. The freeze-drying was carried out in the same manner as in Example 1.

EXAMPLE 7

(a) In the same manner as in Example 1(a), *Streptococcus hemolyticus* was cultivated and was isolated by centrifuge, and the living cells obtained were suspended in physiological saline solution in a proportion of 5 ml. based on the living cells from 100 ml. of the culture medium. The thus formed suspension, when diluted to 20 times, showed an absorbancy at 660 m$\mu$ of 0.47.

(b) To 30 ml. of the thus formed physiological saline suspension, 30 ml. of 4% aqueous sucrose solution were added. Each 2 ml. of the mixture were poured into vials under sterilized conditions and were then dried in the same manner as in Example 1(a) to form a preparation.

EXAMPLE 8

(a) 300 g. of yeast extract (produced by Ebios Yakuhin Kogyo K. K.) was dissolved in 10 l. of distilled water. The solution was neutralized to pH 7.0-7.2 by means of 10% sodium hydroxide solution and was heated at 100° C. for 60 minutes. After cooling the solution, precipitated insolubles were removed by filtration, and the pH of the filtrate was readjusted. Thereafter, the filtrate was poured into sterilized flasks and was steam-sterilized at 120° C. for 10 minutes to prepare a yeast extract medium. (All the subsequent operations were effected under sterilized conditions.) The thus prepared yeast extract medium was inoculated with a culture broth of *Streptococcus hemolyticus* strain Su (ATCC No. 21060), which had previously been cultured for 20 hours in 500 ml. of an ordinary meat-infusion medium, and static culture was carried out at 37° C. for 20 hours. Subsequently, the culture broth was chilled with ice and was centrifuged, and the bacterial cells obtained were washed 2 times with cold physiological saline solution and was then suspended in 500 ml. of BBM. This suspension, when diluted to 20 times, showed an absorbancy at 660 m$\mu$ of 0.48.

(b) To 300 ml. of the above BBM suspension was added 60 ml. of physiological saline solution of pencillin G potassium (1.6×10$^5$ units/ml.), and the mixture was heated at 37° C. for 20 minutes and then at 45° C. for 30 minutes. (The thus treated suspension is referred to as "PCB-45," hereinafter.)

(c) To 50 ml. of PCB-45, 50 ml. of a 4% aqueous L-arginine hydrochloride solution was added. Each 2 ml. of the mixture were poured into vials under sterilized conditions, were pre-freezed at −30° C. for 2 hours, and were dried for 20 hours under a vacuum of 0.01 mm. Hg, while taking such a care that the temperature of the sample did not exceed 20° C. After drying, the pressure was brought back to atmospheric in sterile dry air, and the vials were immediately sealed to form a preparation. This dry preparation did not show any substantial decrease in anti-tumor activity even when stored at 37° C. for 6 months.

EXAMPLE 9

30 ml. of PCB-45, which had been obtained in the same manner as in Example 8(b), were centrifuged at a low temperature. Subsequently, the supernatant was discarded, and the precipitate was washed once with a cold physiological saline solution and was then suspended in a 2% aqueous L-arginine hydrochloride solution to make 30 ml. Each 1 ml. of this suspension was charged into vials and was then dried in the same manner as in Example 8(c) to form a preparation.

EXAMPLE 10

To 30 ml. of PCB-45 obtained in the same manner as in Example 8(b), 30 ml. of 40% aqueous L-ornithine hydrochloride solution was added. Each 2 ml. of the mixture were poured into vials and were then dried in the same manner as in Example 8(c) to form a preparation.

EXAMPLE 11

To 30 ml. of PCB-45 obtained in the same manner as in Example 8(b), 30 ml. of 4% aqueous L-methionine solution were added. Each 2 ml. of the mixture were poured into vials and were then dried to form a preparation.

EXAMPLE 12

To 30 ml. of PCB-45 obtained in the same manner as in Example 8(b), 30 ml. of 4% aqueous L-cystein solution were added. Each 2 ml. of the mixture were poured into vials and were then dried in the same manner as in Example 8(c) to form a preparation.

EXAMPLE 13

To 30 ml. of PCB-45 obtained in the same manner as in Example 8(b), 30 ml. of 4% aqueous sodium L-aspartate solution were added. Each 2 ml. of the mixture were poured into vials and were then dried in the same manner as in Example 8(c) to form a preparation.

EXAMPLE 14

To 30 ml. of PCB-45 obtained in the same manner as in Example 8(b), 30 ml. of 4% aqueous sodium L-glutamate solution were added. Each 2 ml. of the mixture were poured into vials and were then dried in the same manner as in Example 8(c) to form a preparation.

EXAMPLE 15

To 30 ml. of PCB-45 obtained in the same manner as in Example 8(b), 30 ml. of 4% aqueous L-threonine solution were added. Each 2 ml. of the mixture were poured into vials and were then dried in the same manner as in Example 8(c) to form a preparation.

EXAMPLE 16

(a) To 100 ml. of living cell BBM suspension obtained in the same manner as in Example 8(a) were added 20 ml. of physiological saline solution of 108 mg./ml. of cephaloridine (synthetic cephalosporin C, produced by Glaxo Laboratories Co.), and the mixture was heated at 37° C. for 20 minutes and then at 45° C. for 30 minutes. (This suspension is referred to as "CEB-45," hereinafter.)

(b) To 50 ml. of the resulting CEB-45, 50 ml. of 4% aqueous L-arginine hydrochloride solution were added. Each 2 ml. of this mixture were poured into vials under sterilized conditions and were then dried in the same manner as in Example 8(c) to form a preparation. The freeze-drying were carried out in the same manner as in Example 8.

EXAMPLE 17

(a) In the same manner as in Example 8(a) *Streptococcus hemolyticus* was cultivated and was isolated by centrifuge, and the living cells obtained were suspended in physiological saline solution in a proportion of 5 ml. based on the living cells from 100 ml. of the culture medium. The thus formed suspension, when diluted to 20 times, showed an absorbancy at 660 m$\mu$ of 0.47.

(b) To 30 ml. of the thus formed physiological saline suspension, 30 ml. of 4% aqueous L-arginine hydrochloride solution were added. Each 2 ml. of this mixture were poured into vials under sterilized conditions and were then dried in the same manner as in Example 8(c) to form a preparation.

The following are experimental examples carried out by use of the present preparations and of controls.

Experimental Example 1

The dry preparations immediately after preparation according to Examples 1 to 6 were individually suspended in distilled water so that the amounts of the resulting suspensions became equal to those of the cell suspensions before drying. The suspensions were individually diluted to 2 times by addition of BBM (containing 27,000 units/ml. of penicillin). Each 0.1 ml. of the thus diluted suspensions were individually injected intraperitoneally once a day for 5 days into ddY mice, which had been inoculated intraperitoneally before 24 hours with $10^6$ per mouse of Ehrlich ascites carcinoma cells. (The distilled water-suspension and dilution of the dry preparation were carried out every day immediately before injection.) The number of mice employed was 10 per group. The survival ratios of mice after 40 days from the initiation of injection (the ratios of survival mice to the total number of mice) were as shown in Table 1. In the table, Run Nos. 7 to 11 are control examples and Run Nos. 7 and 8 show the cases where the free-drying was effected by addition of distilled water in place of aqueous stabilizer solution.

TABLE 1

| Run No. | Test preparation | Survival ratio of mice (percent) |
|---|---|---|
| 1 | PCB-45 dry preparation (Example 1) | 80 |
| 2 | PCB-45 dry preparation (Example 2) | 80 |
| 3 | PCB-45 dry preparation (Example 3) | 70 |
| 4 | PCB-45 dry preparation (Example 4) | 70 |
| 5 | PCB-45 dry preparation (Example 5) | 70 |
| 6 | CEB-45 dry preparation (Example 6) | 80 |
| 7 | PCB-45 dry preparation (no stabilizer added) | 70 |
| 8 | CEB-45 dry preparation (no stabilizer added) | 70 |
| 9 | PCB-45 | 90 |
| 10 | CEB-45 | 90 |
| 11 | BBM plus penicillin alone | 0 |

Experimental Example 2

The dry preparations, which had been obtained in Examples 1 to 6 and which had been stored in dry state at 37° C. for 3 months, were compared in anti-tumor activity in the same manner as in Experimental Example 1 to obtain the results as shown in Table 2. In the table, Run Nos. 7–9 are control examples and Run Nos. 7 and 8 show the cases where distilled water was added in place of aqueous stabilizer solution.

TABLE 2

| Run No. | Test preparation | Survival ratio of mice (percent) |
|---|---|---|
| 1 | PCB-45 dry preparation (Example 1) | 60 |
| 2 | PCB-45 dry preparation (Example 2) | 60 |
| 3 | PCB-45 dry preparation (Example 3) | 60 |
| 4 | PCB-45 dry preparation (Example 4) | 50 |
| 5 | PCB-45 dry preparation (Example 5) | 50 |
| 6 | CEB-45 dry preparation (Example 6) | 60 |
| 7 | PCB-45 dry preparation (no stabilizer added) | 40 |
| 8 | CEB-45 dry preparation (no stabilizer added) | 40 |
| 9 | BBM plus penicillin alone | 0 |

Experimental Example 3

Living cell suspensions, which had not been subjected to treatment with penicillin or cephalosporin and which had been stored at 37° C. for 3 months, were tested in anti-tumor activity.

Dry preparations prepared according to the process of Example 7 were suspended, immediately before injection, in distilled water to form a suspension with an amount equal to that of the suspension before drying. On the other hand, the ascites of ddY mice, which had been intraperitoneally inoculated with Ehrlich ascites carcinoma cells 7 days before, was collected, was centrifuged at a low speed, was washed once with physiological saline solution, and was then suspended in BBM to form a suspension containing $6 \times 10^7$ cells per ml. 2 ml. of this carcinoma cells suspension were mixed with 5 ml. of a suspension of dry preparations in distilled water and 1 ml. of BBM, and were incubated at 37° C. for 90 minutes.

The thus prepared suspension was intraperitoneally injected once into ddY mice in a dose of 0.5 ml. per mouse. The number of mice employed was 10 per group. The survival ratios of mice after 40 days from the initiation of injection (the ratios of survival mice to the total number of mice) were as shown in Table 3. In the table, Run Nos. 2 and 3 are control examples and Run No. 2 shows the case where distilled water was added in place of aqueous stabilizer solution.

TABLE 3

| Run No. | Test preparation | Survival ratio of mice (percent) |
|---|---|---|
| 1 | Dry preparation of living cell suspension (stabilizer: sucrose). | 50 |
| 2 | Dry preparation of living cell suspension (no stabilizer added). | 30 |
| 3 | BBM alone | 0 |

As is clear from the results shown above, it is possible, according to the present invention, to obtain an anti-tumor preparation markedly high in anti-tumor activity even when stored for a long period of time.

Experimental Example 4

The dry preparations immediately after preparation according to Examples 8–16 were suspended in distilled water so that the amounts of the resulting suspensions became equal to those of the cell suspensions before drying. The suspensions were individually diluted to 2 times by addition of BBM (containing 27,000 units/ml. of penicillin). Each 0.1 ml. of the thus diluted suspensions were individually injected intraperitoneally once a day for 5 days into ddY mice, which had been inoculated intraperitoneally before 24 hours with $10^6$ pieces per mouse of Ehrlich ascites carcinoma cells. (The distilled water-suspension and dilution of the dry preparation were carried out every day immediately before injection). The number of mice employed was 10 per group. The survival ratios of mice after 40 days from the initiation of injection (the ratios of survival mice to the total number of mice) were as shown in Table 4. In the table, Run Nos. 11–14 are control examples and Run Nos. 10 and 11 show the cases where the drying was carried out by addition of distilled water in place of aqueous stabilizer solution.

TABLE 4

| Run No. | Test preparation | Survival ratio of mice (percent) |
|---|---|---|
| 1 | PCB-45 dry preparation (Example 8) | 90 |
| 2 | PCB-45 dry preparation (Example 9) | 90 |
| 3 | PCB-45 dry preparation (Example 10) | 80 |
| 4 | PCB-45 dry preparation (Example 11) | 80 |
| 5 | PCB-45 dry preparation (Example 12) | 80 |
| 6 | PCB-45 dry preparation (Example 13) | 70 |
| 7 | PCB-45 dry preparation (Example 14) | 70 |
| 8 | PCB-45 dry preparation (Example 15) | 70 |
| 9 | CEB-45 dry preparation (Example 16) | 90 |
| 10 | PCB-45 dry preparation (no stabilizer added) | 70 |
| 11 | CEB-45 dry preparation (no stabilizer added) | 70 |
| 12 | PCB-45 | 90 |
| 13 | CEB-45 | 90 |
| 14 | BBM plus penicillin alone | 0 |

Experimental Example 5

The dry preparations, which had been obtained in Examples 8–16 and which had been stored in dry state at 37° C. for 3 months, were compared to each other in anti-tumor activity in the same manner as in Example 4 to obtain the results as shown in Table 5. In the table, Run Nos. 10–12 are control examples and Run Nos. 10 and 11 show the cases where the drying was carried out by addition of distilled water in place of aqueous stabilizer solution.

TABLE 5

| Run No. | Test preparation | Survival ratio of mice (percent) |
|---|---|---|
| 1 | PCB-45 dry preparation (Example 8) | 90 |
| 2 | PCB-45 dry preparation (Example 9) | 90 |
| 3 | PCB-45 dry preparation (Example 10) | 80 |
| 4 | PCB-45 dry preparation (Example 11) | 80 |
| 5 | PCB-45 dry preparation (Example 12) | 80 |
| 6 | PCB-45 dry preparation (Example 13) | 70 |
| 7 | PCB-45 dry preparation (Example 14) | 60 |
| 8 | PCB-45 dry preparation (Example 15) | 60 |
| 9 | CEB-45 dry preparation (Example 16) | 90 |
| 10 | PCB-45 dry preparation (no stabilizer added) | 40 |
| 11 | CEB-45 dry preparation (no stabilizer added) | 40 |
| 12 | BBM plus penicilline alone | 0 |

Experimental Example 6

Living cell suspensions, which had not been subjected to treatment with penicillin or cephalosporin and which had been stored at 37° C. for 3 months, were tested in anti-tumor activity.

Dry preparations prepared according to the process of Example 17 were suspended, immediately before injection, in distilled water to form a suspension with an amount equal to that of the suspension before drying. On the other hand, the ascites of ddY mice, which had been intraperitoneally inoculated with Ehrlich ascites carcinoma cells 7 days before, was collected, was centrifuged at a low speed, was washed once with physiological saline solution, and was then suspended in BBM to form a suspension containing $6 \times 10^7$ cells per ml. 2 ml. of this carcinoma cells suspension were mixed with 5 ml. of a suspension of dry preparations in distilled water and 1 ml. of BBM, and was incubated at 37° C. for 90 minutes. The thus prepared suspension was intraperitoneally injected once into ddY mice in a dose of 0.5 ml. per mouse. The number of mice employed was 10 per group. The survival ratios of mice after 40 days from the initiation of injection (the ratios of survival mice to the total number of mice) were as shown in Table 6. In the table, Run Nos. 2 and 3 are control examples and Run No. 2 shows the case where the drying was carried out by addition of distilled water in place of aqueous stabilizer solution.

TABLE 6

| Run No. | Test preparation | Survival ratio of mice (percent) |
|---|---|---|
| 1 | Dry preparation of living cell suspension (stabilizer: L-arginine hydrochloride). | 70 |
| 2 | Dry preparation of living cell suspension (no stabilizer added). | 30 |
| 3 | BBM alone | 0 |

As is clear from the above results, it is possible, according to the present invention, to obtain an anti-tumor preparation markedly high in anti-tumor activity even when stored for a long period of time.

What is claimed is:

1. A method for providing a dried stable anti-tumor preparation of *Streptococcus hemolyticus,* produced by adding an antibiotic selected from the group consisting of penicillin and cephalosporin C to a cell suspension of *Streptococcus hemolyticus* in a suspension medium to make the concentration greater than 0.044 M, incubating the mixture at 30 to 38° C. for at least 10 minutes and then heating at 38 to 50° C. for 20 to 60 minutes, comprising:
adding to said anti-tumor preparation of *Streptococcus hemolyticus* as a stabilizer one or more of agents selected from the group consisting of arginine, ornithine, methionine, alanine, aspartic acid, citrulline, cysteine, cystine glutamic acid, glycine, histidine, hydroxyproline, isoleucine, leucine, ornithine, phenylalanine proline, serine, threonine, tyrosine and valine, in the ratio of dry cells of *Streptococcus hemolyticus*: stabilizer of 1:0.5 to 5; and drying the resultant mixture at a temperature no greater than 20° C.

2. A method in accordance with claim 1 wherein said drying is freeze-drying.

References Cited

UNITED STATES PATENTS

| | | | |
|---|---|---|---|
| 2,908,614 | 10/1959 | Muggleton et al. | 424—93 |
| 3,477,914 | 11/1969 | Okamoto et al. | 424—93 |

OTHER REFERENCES

Heckly et al., Applied Microbiology, vol. 8, pages 52–54, January 1960.

RICHARD L. HUFF, Primary Examiner

U.S. Cl. X.R.

424—92